United States Patent
Kumar

(10) Patent No.: US 9,155,427 B1
(45) Date of Patent: Oct. 13, 2015

(54) CHOPPING BOARD ACCESSORY WITH WASTE RECEPTACLE

(71) Applicant: Lakshmi Kumar, Little Neck, NY (US)

(72) Inventor: Lakshmi Kumar, Little Neck, NY (US)

( * ) Notice: Subject to any disclaimer, the term of this patent is extended or adjusted under 35 U.S.C. 154(b) by 0 days.

(21) Appl. No.: 14/255,104

(22) Filed: Apr. 17, 2014

Related U.S. Application Data

(60) Provisional application No. 61/813,032, filed on Apr. 17, 2013.

(51) Int. Cl.
*A47J 47/00* (2006.01)

(52) U.S. Cl.
CPC .................... *A47J 47/005* (2013.01)

(58) Field of Classification Search
CPC ......... A47J 47/00; A47J 47/005; A47J 47/14; A47J 47/16; A47J 47/20
USPC ........... 220/500, 505; D7/698; 269/289 R, 15
See application file for complete search history.

(56) References Cited

U.S. PATENT DOCUMENTS

| | | | |
|---|---|---|---|
| 2,452,445 A | 10/1948 | Ericsson | |
| D161,596 S | 11/1949 | Russ | |
| D159,881 S | 12/1949 | Zekowski | |
| 2,796,902 A | 6/1957 | Mercury | |
| 3,598,164 A | 8/1971 | August | |
| D283,777 S | 5/1986 | Morin | |
| 4,653,737 A | 3/1987 | Haskins et al. | |
| 4,840,361 A * | 6/1989 | Richter | 269/289 R |
| 5,044,059 A | 9/1991 | De Giulio | |
| 5,366,208 A | 11/1994 | Benjamin | |
| 5,382,009 A | 1/1995 | Mertz et al. | |
| 5,386,978 A * | 2/1995 | Ladwig | 269/289 R |
| 5,527,022 A | 6/1996 | Gibson | |
| 5,791,479 A | 8/1998 | Beres | |
| 5,860,367 A | 1/1999 | Riegel et al. | |
| 5,865,105 A | 2/1999 | Pepelanov | |
| 5,938,185 A | 8/1999 | Kletter | |
| 5,996,983 A | 12/1999 | Laurenzi | |
| 6,026,972 A | 2/2000 | Makowski | |
| 6,341,770 B1 | 1/2002 | Landherr | |
| 6,371,470 B1 | 4/2002 | Ward | |
| 6,386,531 B1 | 5/2002 | Prosser | |
| 6,422,551 B1 | 7/2002 | Brotz | |
| 6,478,293 B1 | 11/2002 | Keener | |
| D472,776 S | 4/2003 | Porter | |
| 6,994,336 B2 | 2/2006 | Loo | |
| D522,812 S | 6/2006 | Lee | |
| 7,322,573 B1 | 1/2008 | Edmond | |
| 7,422,201 B2 | 9/2008 | Pearl et al. | |
| D587,031 S | 2/2009 | Pourounidis et al. | |
| 7,530,558 B2 | 5/2009 | Casale et al. | |
| 7,578,234 B2 | 8/2009 | Sumner | |
| D605,908 S | 12/2009 | Pearl et al. | |
| 7,681,871 B2 | 3/2010 | Shew et al. | |
| D638,265 S | 5/2011 | Shamoon | |
| 8,070,148 B2 | 12/2011 | Nishida | |
| D655,939 S | 3/2012 | Tracy | |
| 8,220,789 B2 | 7/2012 | Pourounidis et al. | |
| 8,251,357 B2 * | 8/2012 | Young | 269/15 |
| 8,360,407 B2 * | 1/2013 | Kent | 269/15 |
| D677,130 S | 3/2013 | Robinson | |

(Continued)

*Primary Examiner* — Steven A. Reynolds
*Assistant Examiner* — Javier A Pagan
(74) *Attorney, Agent, or Firm* — Goldberg Cohen LLP

(57) ABSTRACT

A slanted chopping board accessory including a recessed frame to retain a chopping board as well as a waste receptacle for collecting waste, trimmings, and liquids that are produced during food preparation.

20 Claims, 5 Drawing Sheets

(56) References Cited

U.S. PATENT DOCUMENTS

| | | |
|---|---|---|
| 2002/0195763 A1 | 12/2002 | Benjamin |
| 2004/0046301 A1 | 3/2004 | Thompson et al. |
| 2004/0119221 A1 | 6/2004 | Davis |
| 2007/0001359 A1* | 1/2007 | Pearl et al. ............ 269/289 R |
| 2007/0080487 A1 | 4/2007 | Yartz |
| 2009/0146353 A1 | 6/2009 | Hashim |
| 2009/0200723 A1 | 8/2009 | Lim et al. |
| 2010/0314814 A1 | 12/2010 | Zeitlin |

\* cited by examiner

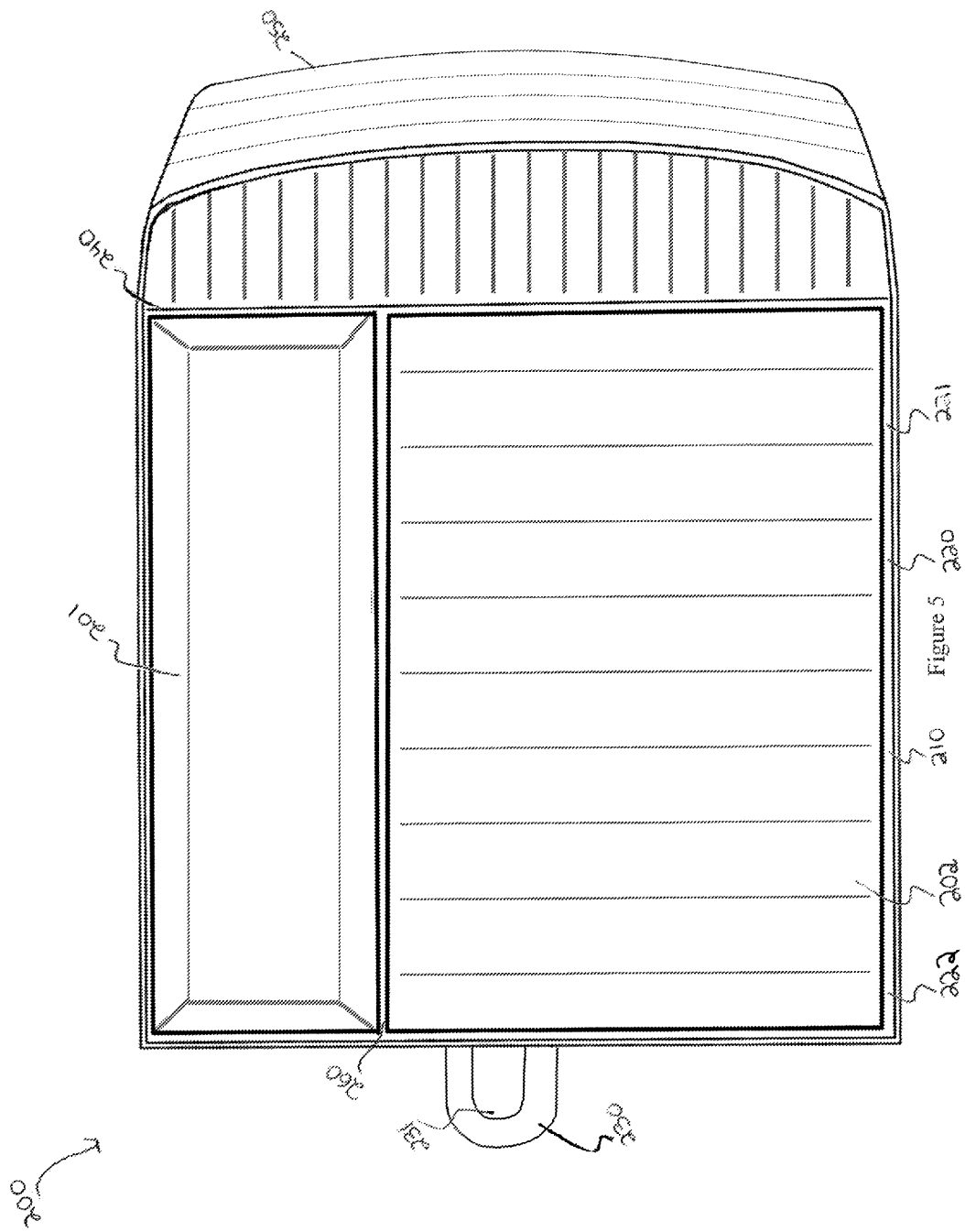

CHOPPING BOARD ACCESSORY WITH WASTE RECEPTACLE

RELATED APPLICATIONS

This application claims the benefit of U.S. Provisional Patent Application Ser. No. 61/813,032, filed Apr. 17, 2013, the contents of which application are fully incorporated herein by reference.

FIELD OF THE INVENTION

The present invention relates to kitchen devices, and more particularly to a food-chopping aid that facilitates clean and efficient disposal of waste material during food preparation.

BACKGROUND OF THE INVENTION

Chopping or cutting boards used to prepare vegetables, meats, and so forth, are an indispensable utensil in kitchens the world over. A variety of cutting boards and cutting board accessories are known in the prior art, for example, as set forth in U.S. Pat. No. 8,360,407 ("the '407 patent"), issued to Joseph Kent, which discloses a cutting board having a planar cutting surface. Though common in the prior art for cutting boards, planar boards that lie flat on a counter or table suffer from the tendency of waste and liquids to remain on the cutting board during use and/or to drip off the board onto the counter, table-top, or floor, creating a messy and/or unsanitary situation. For example, in the case of raw meat, it is highly desirable that the raw meat juices be kept away from the meat and other food being prepared at the same time. With traditional cutting boards, however, those juices often remain on the cutting board during food preparation and/or drip off the sides where they are likely to contaminate other food.

The '407 patent also discloses a waste receptacle, which is a separate unit from the cutting board, and which can be attached to or detached from the cutting board. Drawbacks of chopping boards such as that disclosed in the '407 patent with discrete accessory elements include the difficulty of cleaning discrete elements, the greater likelihood that or more accessory elements will malfunction, and the greater likelihood that the portions of the device will be lost or misplaced.

Another example of cutting boards in the prior art can be found in U.S. Pat. No. 8,251,357 ("the '357 patent") issued to Keith Young, which discloses an apparatus for treating food substances. The '357 patent also discloses a waste receptacle that can be used with the cutting board Like the '407 patent, the '357 patent discloses a multi-piece apparatus, and therefore suffers from some of the same drawbacks identified above.

U.S. Pat. No. 5,366,208 ("the '208 patent") issued to William Benjamin discloses a cutting board with separate tray for receiving waste. When assembled the tray is accessed through an opening or cut-out in the chopping board. Like some of the other prior art, the '208 patent suffers from the disadvantages of using a planar, rather than slanted device, the latter of which can provide automatic liquid run-off away from food and the food preparation surfaces. Moreover, practicing the device of the '208 patent requires reducing the surface area available for chopping in order to provide the cutting board with the opening or cut-out. In addition, the receptacle of the '208 patent (which lies directly underneath the chopping surface) effectively raises the height of the chopping surface considerably above the height of the work surface, creating an awkward environment for cutting or chopping in which it is difficult or impossible for the user to rest any part of his hands or arms on the work surface during food preparation.

In addition to addressing the drawbacks identified above with respect to the prior art, there is a need to provide a chopping board accessory that can accommodate multiple chopping boards simultaneously during use. It is often desirable to keep certain foods separate from other foods during food preparation. For example, it is commonly accepted that meat, poultry, and fish should be kept separate from vegetables and fruits during preparation to avoid cross-contamination, and that these types of foods should be prepared on separate cutting boards. Likewise, sharp foods such as onions and garlic are often kept separate from other foods and chopped on a separate cutting board, to avoid transferring their strong flavors to other foods such as fruits. Thus, there is a need for a chopping board accessory that facilitates waste disposal and liquid run-off from multiple chopping boards or surfaces at the same time.

Accordingly, there is a need to improve the utility, convenience, efficiency, and effectiveness of chopping board accessories.

SUMMARY OF THE INVENTION

It is an object of the present invention to provide a single-piece, integrated, and slanted/inclined chopping board accessory for improved and more efficient waste disposal and sanitation during food preparation, while being easy to clean, easy to store, and generally user-friendly.

It is a further object of the present invention to provide a single-piece, and slanted/inclined chopping board accessory with integrated waste receptacle that simultaneously accommodates both a chopping board and a separate surface (e.g. a plate or tray) for holding already prepared food, allowing the user to make room on the chopping board to perform additional chopping by easily transferring already prepared food from the chopping board to the separate surface during use.

Further features, benefits, and advantages of the present invention will become apparent from the accompanying drawings, as well as the detailed description set forth below.

BRIEF DESCRIPTION OF THE DRAWINGS

FIG. 5 is a top view of an alternative embodiment of the present invention.

DETAILED DESCRIPTION OF THE INVENTION AND PREFERRED EMBODIMENTS

The present invention provides a chopping board accessory for use in the kitchen, the accessory preferably having a tray or base with raised edges (e.g. on three sides) and/or a recessed frame to house one or more chopping boards or other food preparation surfaces, and a fully integrated open receptacle for easily receiving either waste or usable food particles or liquids produced as byproducts of the food preparation process. The tray or base and receptacle form a single, integrated unit, the receptacle being bendable relative to the tray/base and vice versa. The device can be stored easily (e.g. by hanging on a hook) and cleaned easily. Typically, while in use, the receptacle will hang from the edge of the work surface, with opening facing upwards, such that food byproducts can be disposed of simply by pushing them or sliding them (with the side of a knife, e.g.) off the cutting board and over the edge of the work surface, causing them to fall into the open receptacle. However, the accessory of the present invention can also be used with the back side of the receptacle lying parallel to, and on the same work surface as, the tray or base. When used in this manner, the user can dispose of food byproducts by simply sliding or pushing them from the cutting board into the receptacle (without pushing them over the edge of the work surface).

Figure 1:
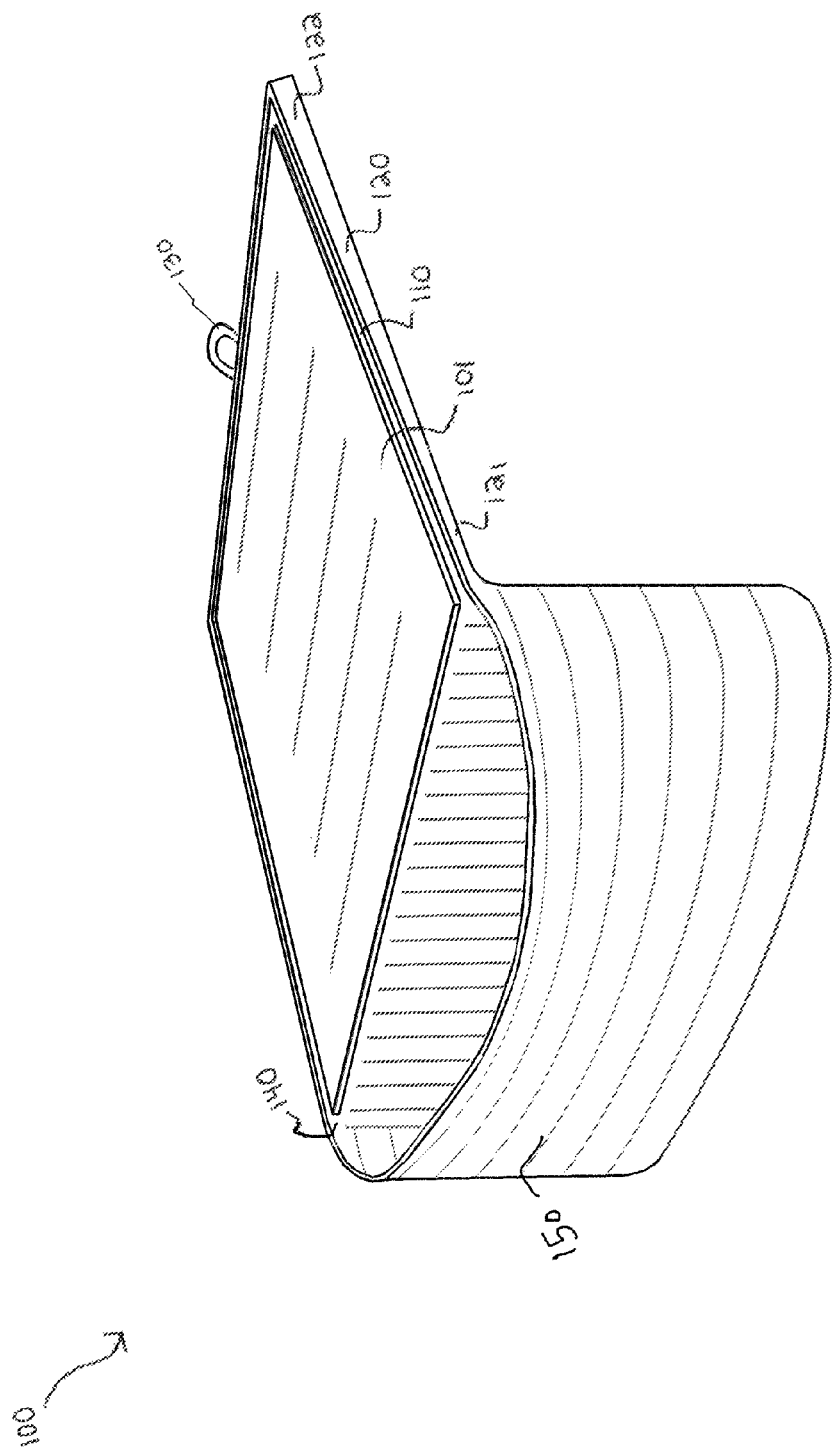
FIG. 1 is a front perspective view of a preferred embodiment of the present invention assembled with a cutting board.
Figure 2:
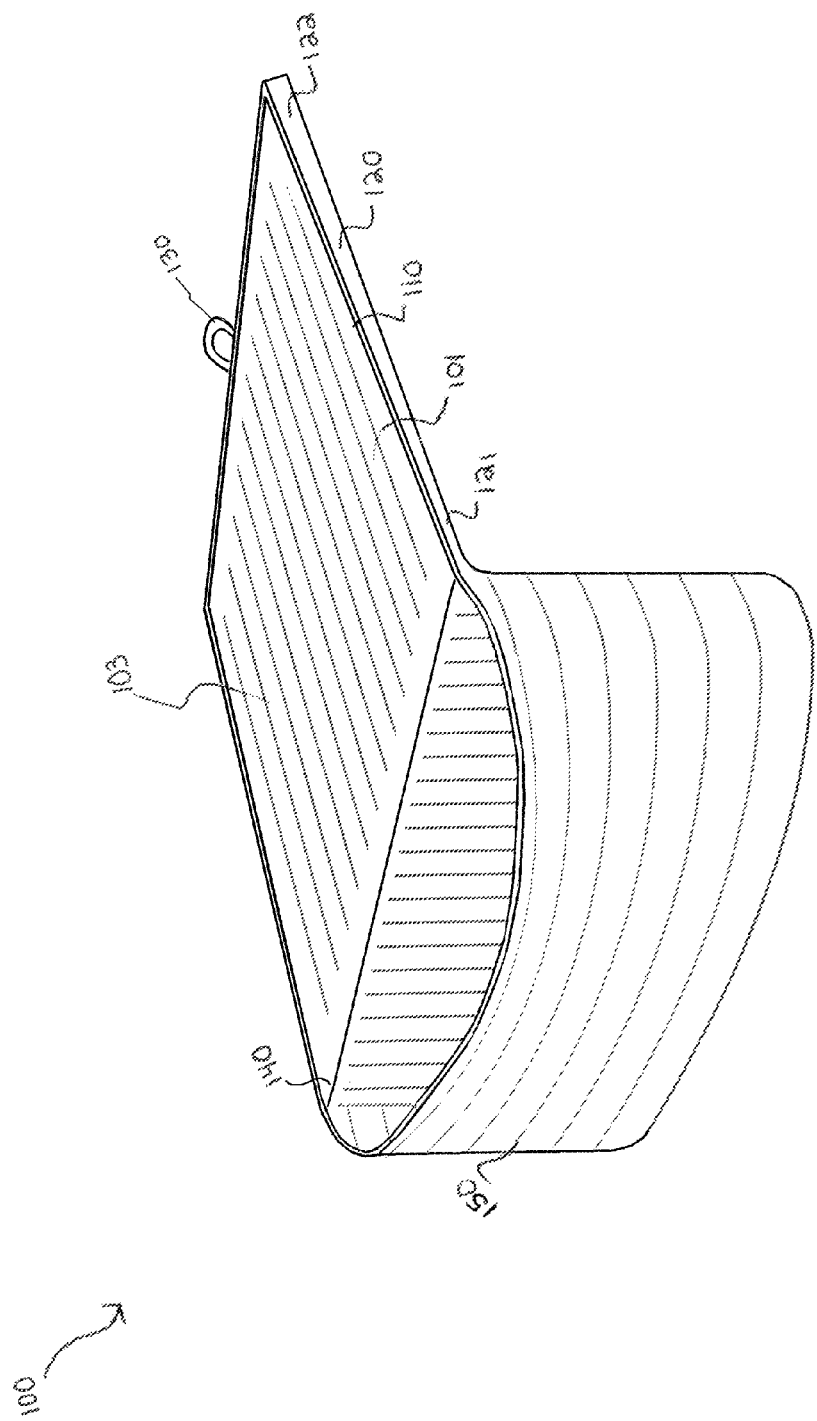
FIG. 2 is a front perspective view of the unassembled embodiment of FIG. 1.
Figure 3:
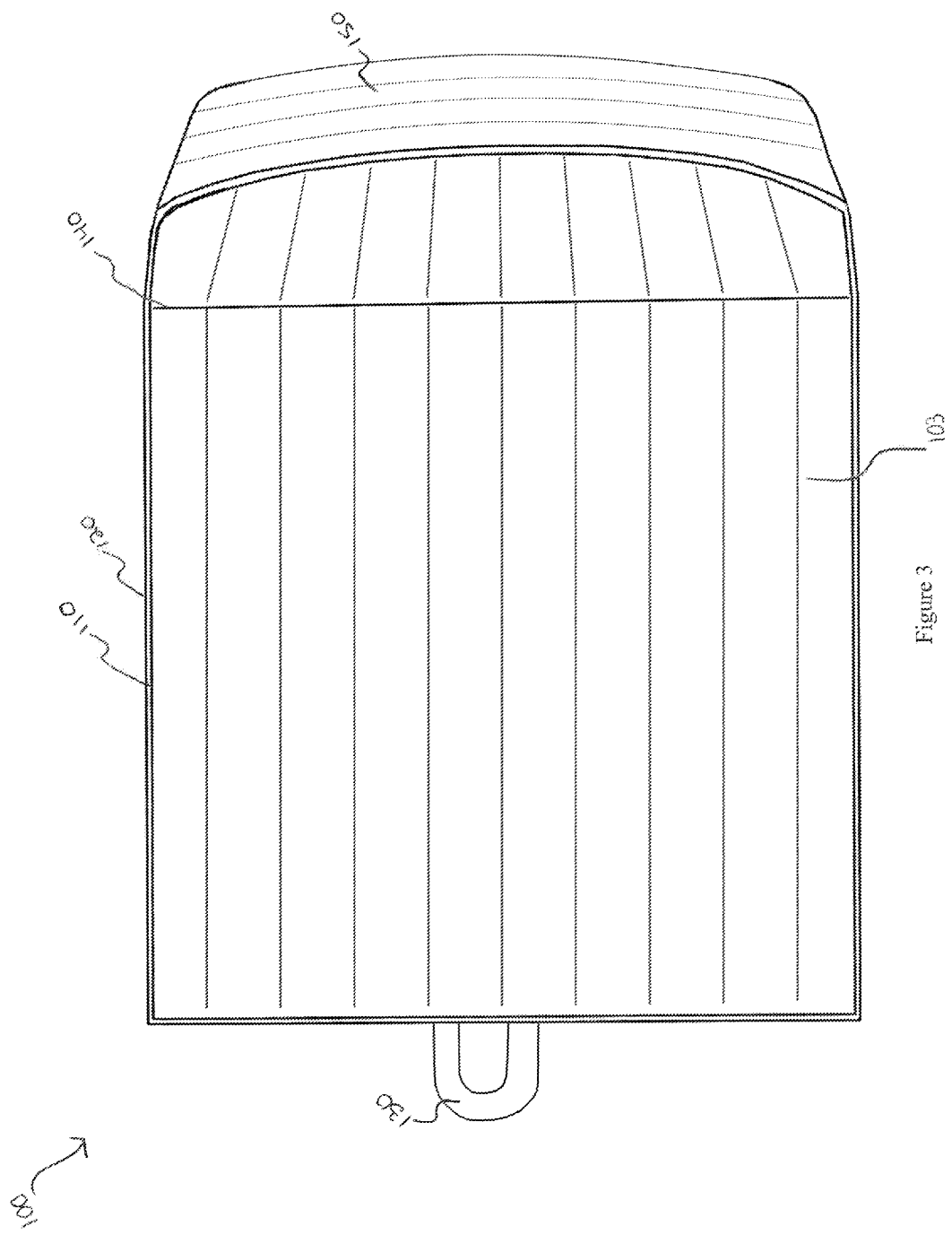
FIG. 3 is a top view of the embodiment of FIG. 2.

In addition, the tray or base portion of the present invention that houses the one or more chopping boards has a thicker portion opposite the waste receptacle and a thinner portion adjacent the waste receptacle, allowing the chopping board(s), when housed in the accessory, to present at an incline relative to a flat table-top, countertop, or other work surface, such that the chopping board(s) is/are angled down towards the receptacle during use, resulting in automatic run-off of undesirable liquid byproducts of the food preparation process into the receptacle (rather than onto the work surface or floor), as well as allowing for easy disposal of solid food byproducts, such as peels, stems, cores, trimmings, and other food scraps. In one such embodiment, the base can have a triangular cross-section (as shown in FIGS. 1 and 2).

In a preferred embodiment, the present invention is flexible and molded entirely of silicone, which provides strong grip between the accessory and the work surface, as well as between the chopping board(s) and the accessory in which they are housed. Silicone is also easy to clean (it is considered dishwasher-safe), resistant to breaking and tearing, and resistant to the growth of bacteria or other pathogens (silicone can be boiled to sterilize it). The flexibility of silicone also promotes easy storage of the device and provides bendability between the tray/base and the receptacle of the present invention.

Likewise, a flexible material allows the user to easily choose and switch between letting the receptacle hang from the edge of the work surface (by bending the open receptacle portion over the edge of the work surface), or alternatively by lying the receptacle on the work surface, during use.

A flexible material allows for easy disposal of waste and liquid out of the open receptacle by holding the sides of the receptacle and shaking it upside down over a trash can or the like.

It will be appreciated that other materials known in the art would suit one or more of these characteristics and could be substituted for silicone. For example, benefits of the present invention can be realized with rigid materials as well as flexible materials. Multiple materials can be used as well. For example, a rigid material such as metal can be used for the receptacle, while a flexible material such as silicone can be used for the tray or base. In an alternative embodiment of the present invention, an exposed or embedded hinge as known in the art is used to couple the receptacle to the tray or base and allow the receptacle to hang from the work surface or alternatively lie on the work surface during use.

In an alternative embodiment of the present invention, the tray or base has two or more recessed frames (with raised edges) in order to house one or more chopping boards and one or more other surfaces for holding prepared food at the same time. One or more ridge(s) or edge(s) integrated into the tray or base and extending upwards from the tray/base is/are used as dividers to define each of the recesses while keeping the chopping board and other surface separate from each other. It should be appreciated, however, that multiple recesses and a ridge are not required for the tray/base to simultaneously house one or more chopping boards and one or more other surfaces for holding prepared food; a single recess would suffice for this purpose.

In another alternative embodiment of the present invention, the accessory comprises a means (such as tab extending from the accessory and containing a hole or opening) for hanging the accessory on a hook or the like for easy storage.

It should be noted that while the open receptacle of the present invention is preferably used to collect waste and unwanted byproducts of the food preparation process, it can alternatively be used to hold liquids or food particles that the user wishes to retain, such as gravy, for example.

Now with particular reference to the preferred embodiment of the present invention shown in FIGS. 1-4, kitchen accessory 100 comprises tray or base 120 and open receptacle 150. Tray or base 120 (hereinafter "tray") and open receptacle 150 are integrated together as a single unit and are bendable relative to each other at pivot line 140 which is situated between tray 120 and open receptacle 150. Both tray 120 and open receptacle 150 of kitchen accessory 100 are preferably made of silicone, but other flexible materials are also suitable as described above. The kitchen accessory 100 can hang over the edge of a work surface (not shown). Specifically, kitchen accessory 100 can bend such that open receptacle 150 hangs over the side of the work surface. Kitchen accessory 100 can also be used in a linear orientation such that there is no bending at pivot line 140 and the open receptacle 150 lies with its back (not shown) on the work surface. Moreover, in the linear orientation, kitchen accessory 100 can also be mounted onto a wall for purposes of storage or the like by means of a tab 130 containing a hole or opening.

Tray 120 comprises first portion 121 and a second portion 122, second portion 122 being thicker than first portion 121, such that when kitchen accessory 100 is placed on a flat surface, tray 120 inclines down towards open receptacle 150. In this embodiment, the thickness of the tray 120 decreases linearly and continuously from the side of the tray opposite the open receptacle 150 to the side of the tray 120 adjacent the open receptacle 150, thereby creating a smooth and continuous incline. This causes liquid by-products from the food preparation process to automatically flow into open receptacle 150. It will be appreciated, however that the thickness of the tray need not decrease continuously or linearly to accomplish this goal. For example, a single, discreet raised ridge or rib at the side of the tray opposite the open receptacle, with the rest of the tray having a uniform thickness, would provide a suitable alternative to the embodiment shown in FIGS. 1-4.

FIGS. 1 and 2 show the preferred embodiment of the present invention in a preferred orientation for use. In this orientation, kitchen accessory 100 is placed on a flat work surface and open receptacle 150 bends at pivot line 140 and hangs over the side of the work surface.

Tray 120 is adapted to house a cutting board 101. Tray 120 has a recessed frame 110 having raised edges, such that cutting board 101 is nested in recessed frame 110 in tray 120. Recessed frame 110 secures cutting board 101 during use. In a preferred embodiment, the length and width of the cutting board 101 should match the length and width, respectively, of the recessed portion 103 of the tray 120, or can be smaller.

Figure 4:
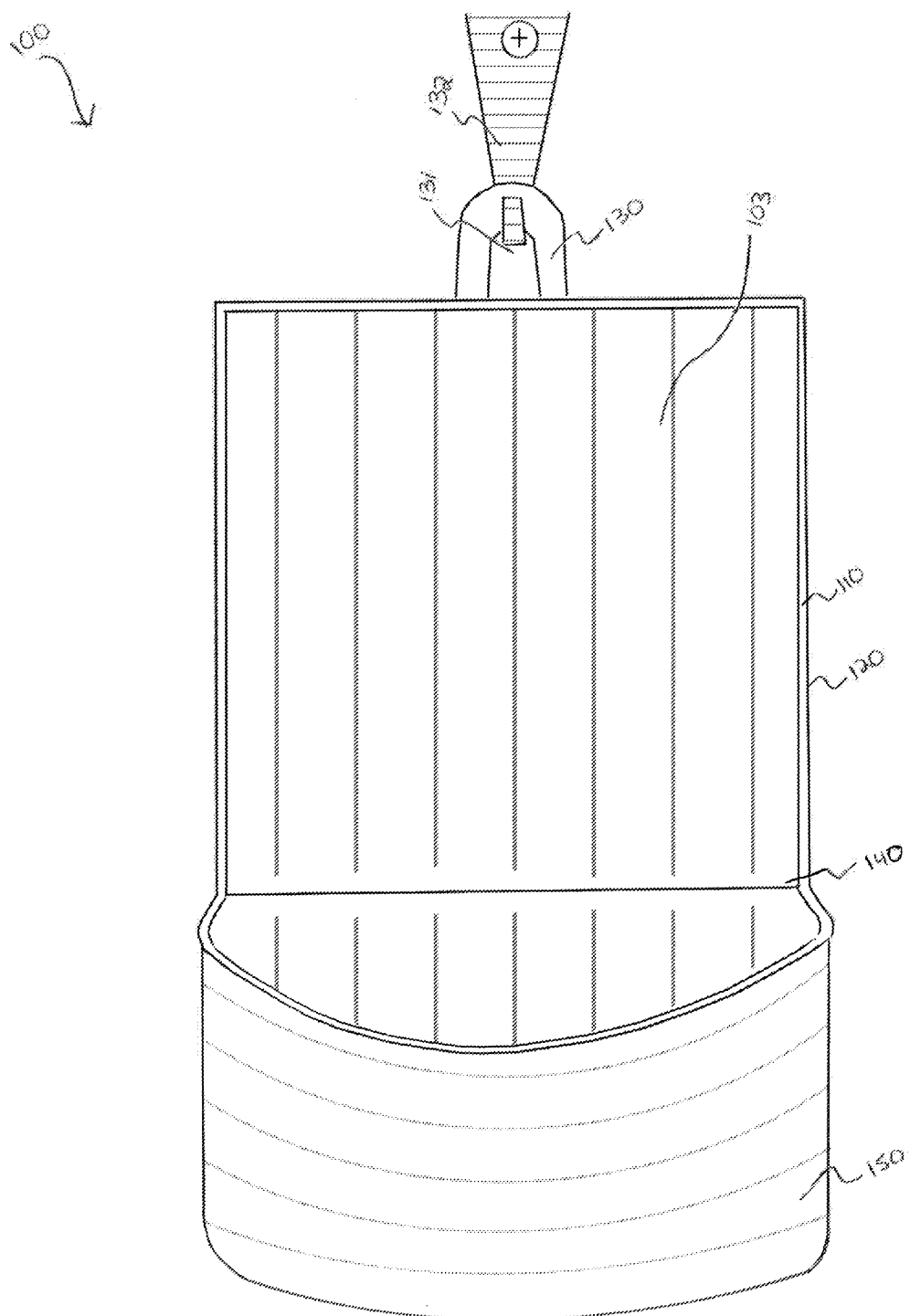
FIG. 4 is a top view of the embodiment in FIG. 2 shown in a stored position.

With reference to FIG. 4, an example of an in-storage view of the present invention is shown, wherein the accessory of the present invention is hung on a hook 132 affixed to a wall. Tab 130 extending from tray 120 contains opening or hole 131 that can be hooked on to hook 132. Other storage means for the present invention will be readily apparent to those skilled in the art.

With reference to FIG. 5, a further embodiment of the present invention is shown. Kitchen accessory 200 comprises tray 220 and open receptacle 250. Tray 220 and open receptacle 250 are integrated together as a single unit. Tray 220 and open receptacle 250 are bendable relative to each other at pivot line 240, which is situated between the tray and the open receptacle. Both tray 220 and open receptacle 250 of kitchen accessory 200 are preferably made of silicone, but other flexible or non-flexible materials may also be suitable. This flexible material enables kitchen accessory 200 to bend at pivot line 240. Kitchen accessory 200 can bend over so that open receptacle 250 hangs over the side of a work surface during use. Kitchen accessory 200 can also be used and/or stored in a linear orientation as described above where there is bending at pivot line 240. In its linear orientation, kitchen accessory 200 can be mounted onto a wall by means of tab 230 and hole or opening 231 as described above.

Tray 220 comprises first portion 221 and a second portion 222, second portion 222 being thicker than first portion 221, such that when kitchen accessory 200 is placed on a flat surface, tray 220 inclines down towards open receptacle 250. This causes liquid by-products from the food preparation process to automatically flow into open receptacle 250.

As shown in FIG. 5, during use, the kitchen accessory 200 is placed on a flat surface and open receptacle 250 bends over at pivot line 240 and hangs over the side of the work surface (not shown).

In addition, tray 220 has recessed frame 210 having raised edges which is adapted to, at the same time, house both a cutting board 201 and another element 202 (e.g. a plate, tray, or other surface) for holding prepared/chopped food. In accordance with this embodiment, during food preparation the user can make room on the chopping board to perform additional chopping by easily transferring already chopped food from the chopping board 201 to the plate or other surface 202—the other surface 202 being housed in the same tray 220 as the chopping board 201. Alternatively, the tray can house multiple cutting boards and/or multiple elements for holding prepared foods (e.g., one of the cutting boards/other surfaces can be used for vegetables, another for meat, etc.). The tray can house the cutting board and other surface in the same recessed frame 210.

Alternatively, recessed frame 210 can be broken into multiple recesses by one or more ridge 260. In this embodiment, cutting board 201 and other surface 202 are housed in the two recesses of recessed frame 210 in tray 220 separated by ridge 260. Recessed frame 210 secures cutting boards 201, 202 during use. However, it is not necessary to divide the recessed area of the tray or to provide a ridge 260 to fully achieve the purpose of the invention.

The disclosures herein may suitably serve other purposes in addition to those set forth above, as will be appreciated by those with skill in the art. For example, the invention can be used in a hanging, vertical position (e.g., against a wall), as shown in FIG. 4, to store items such as recipe books, cooking utensils, or the like. Other suitable uses will occur to those with skill in the art.

The above description and drawings are considered that of the preferred embodiments of the present invention only. Modifications of the invention will occur to those skilled in the art and to those who make or use the invention. Therefore, it is understood that the embodiments shown in the drawings and described above are merely for illustrative purposes only, and are not intended to limit the scope of the invention.

I claim:

1. A kitchen accessory, comprising:
   a kitchen accessory separate from and complementary to a cutting board, such that a cutting board can be placed on said kitchen accessory for said kitchen accessory to catch food and/or liquid from the cutting board during a food preparation process using the cutting board, said kitchen accessory comprising:
   a base and a receptacle, said receptacle comprising an opening and a back side;
   said base comprising a recess for receiving therein a cutting board that is separate from said kitchen accessory;
   said base and said open receptacle being bendable relative to each other such that said receptacle can be configured to hang from said base with said opening facing upwards, or can be configured with said back side lying on the same work surface as said base; and,
   wherein said base has a triangular cross-section.

2. The kitchen accessory of claim 1 wherein said base and said open receptacle are integrated with each other such that they are not separable.

3. The kitchen accessory of claim 1 wherein said kitchen accessory is configured such that, when said base is placed on a flat surface, said base inclines down towards said receptacle.

4. The kitchen accessory of claim 1 wherein said base is a flexible base.

5. The kitchen accessory of claim 1 wherein said recess of said base is adapted to house at least one cutting board and at least one element adapted to hold prepared food.

6. The kitchen accessory of claim 5 wherein said kitchen accessory can be used in conjunction with cutting boards of different sizes.

7. The kitchen accessory of claim 1 wherein said kitchen accessory is molded entirely out of silicone.

8. A kitchen accessory, comprising:
   a kitchen accessory separate from and complementary to a cutting board, such that a cutting board can be placed on said kitchen accessory for said kitchen accessory to catch food and/or liquid from the cutting board during a food preparation process using the cutting board, said kitchen accessory comprising:
   a base and an open receptacle;
   said base being a flexible base;
   said base comprising a recess for receiving therein a cutting board that is separate from said kitchen accessory;
   wherein said base and said open receptacle are integrated with each other such that they are not separable;
   said base and said open receptacle being bendable relative to each other such that said receptacle can be configured to hang from said base with said opening facing upwards, or can be configured with said back side lying on the same work surface as said base;
   wherein said kitchen accessory is configured such that, when said base is placed on a flat surface, said base inclines down towards said receptacle;
   and wherein said kitchen accessory is molded entirely out of silicone.

9. The kitchen accessory of claim 8 wherein said accessory comprises a hinge between said base and said open receptacle.

10. The kitchen accessory of claim 8 wherein said base comprises a triangular cross-section which is oriented so as to provide said incline of said base down toward said receptacle when said base is placed on a flat surface.

11. The kitchen accessory of claim 8 wherein said base comprises a recessed frame, such that said cutting board is housed in said recessed frame.

12. The kitchen accessory of claim 8 wherein said base is adapted to house at least one cutting board and at least one element adapted to hold prepared food.

13. The kitchen accessory of claim 8 wherein said base comprises a second recess, said recess for a cutting board and said second recess being separated by at least one ridge.

14. The kitchen accessory of claim 8 wherein said kitchen accessory can be used in conjunction with cutting boards of different sizes.

15. A kitchen accessory, comprising:
a kitchen accessory separate from and complementary to a cutting board, such that a cutting board can be placed on said kitchen accessory for said kitchen accessory to catch food and/or liquid from the cutting board during a food preparation process using the cutting board, said kitchen accessory comprising:
a base and an open receptacle;
said base being a flexible base;
said base comprising a recess for receiving therein a cutting board that is separate from said kitchen accessory;
said base and said open receptacle being integrated with each other such that they are not separable;
wherein said base comprises a triangular cross-section which is oriented such that when said base is placed on a flat surface, said base inclines down towards said receptacle; and,
wherein said kitchen accessory is molded entirely out of silicone.

16. The kitchen accessory of claim 15 wherein said base and said open receptacle are bendable relative to each other such that said receptacle can be configured to hang from said base with said opening facing upwards, or can be configured with said back side lying on the same work surface as said base.

17. The kitchen accessory of claim 16 wherein at least one cutting board and at least one element adapted to hold prepared food are housed in said recess of said base.

18. The kitchen accessory of claim 15 wherein said kitchen accessory can be used in conjunction with cutting boards of different sizes.

19. The kitchen accessory of claim 15 wherein said recess of said base comprises two recesses, said recesses being separated by at least one ridge.

20. The kitchen accessory of claim 15 wherein said open receptacle has a back side, and wherein said open receptacle can be configured with said back side lying on the same work surface as said base when said kitchen accessory is in use.

* * * * *